(12) United States Patent
Hope et al.

(10) Patent No.: US 6,520,478 B1
(45) Date of Patent: Feb. 18, 2003

(54) DIRTY FLUID VALVE WITH MECHANICAL LATCH

(75) Inventors: Rodney C. Hope, Sugar Land, TX (US); W. Robert Cox, Magnolia, TX (US)

(73) Assignee: Gilmore Valve Co., Ltd., Houston, TX (US)

( * ) Notice: Subject to any disclaimer, the term of this patent is extended or adjusted under 35 U.S.C. 154(b) by 0 days.

(21) Appl. No.: 09/982,710

(22) Filed: Oct. 18, 2001

(51) Int. Cl.$^7$ .............................................. F16K 51/00
(52) U.S. Cl. .......................................... 251/90; 251/297
(58) Field of Search ..................... 251/297, 90

(56) References Cited

U.S. PATENT DOCUMENTS

| | | |
|---|---|---|
| 3,174,500 A | 3/1965 | Johnson et al. |
| 3,665,813 A | 5/1972 | Loveless |
| 3,790,129 A | 2/1974 | Pauls |
| 4,256,141 A | 3/1981 | Peters |
| 4,260,132 A | 4/1981 | Habiger |
| 4,342,335 A | 8/1982 | Reinicker et al. |
| 4,355,660 A | 10/1982 | Huffman |
| 4,364,412 A | 12/1982 | Peters |
| 4,442,860 A | 4/1984 | Taylor |
| 4,643,215 A * | 2/1987 | Phlipot et al. ............... 251/297 |
| 4,913,190 A | 4/1990 | Kugler |
| 5,868,166 A * | 2/1999 | Miller ........................ 251/297 |

OTHER PUBLICATIONS

Gilmore Valve Co.; Dirty Fluid Valve Double Piloted 2–Way; 25080; Aug. 24, 1992; 2 pages; Houston, Texas.
Gilmore Valve Co.; Normally Open 2–Way; 25081; Dec. 18, 1992; 1 page; Houston, Texas.
Gilmore Valve Co.; Dirty Fluid Valve 2–Way, NC; 25082; Aug. 24, 1992; 2 pages; Houston, Texas.
Gilmore Valve Co.; Dirty Fluid Valve 2–Way, NO; 25085; Mar. 2, 1994; 2 pages; Houston, Texas.
Gilmore Valve Co.; Normally Closed 2–Way Downhole; 25086; Aug. 3, 1994; 1 page; Houston, Texas.

* cited by examiner

*Primary Examiner*—Gene Mancene
*Assistant Examiner*—John Bastianelli
(74) *Attorney, Agent, or Firm*—Blackwell Sanders Peper Martin LLP

(57) ABSTRACT

A dirty fluid valve having a mechanical latching or detent system to secure the valve in an open or closed position is disclosed. The preferred detent assembly includes a c-ring that is engaged and urged outwardly by radially extending pins. The pins are urged outwardly by a ball bearing that is continuously biased by a spring carrier in combination with at least one belleville spring. The spring is captured between the spring carrier and an adjusting nut that can be rotated to vary the load on the spring. The detent assembly releasingly engages a first detent groove in the valve body when the valve piston is in the valve closed position and releasingly engages a second detent groove in the valve body when the piston is in the valve open position.

5 Claims, 7 Drawing Sheets

DIRTY FLUID VALVE WITH MECHANICAL LATCH

BACKGROUND OF THE INVENTION

1. Field of the Invention

The present invention relates to a dirty fluid sampling valve and more particularly to a dirty fluid sampling valve having a mechanical latching or detent system to secure the valve in an open or closed position. The mechanical latching system itself can be used in other types of two position valves to secure the valve in an open or closed position.

2. Description of the Prior Art

Dirty fluid sampling valves are designed for insertion into a valve chamber in the body of a downhole tool used for sampling wellbore fluids at varying depths. The typical downhole tool has approximately seven to ten sample collection bottles with a different dirty fluid valve connected to each bottle. Prior to insertion of the tool into the hole, the sample collection bottles are empty and all the dirty fluid valves are closed. The dirty fluid valves are then opened at various depths to sample different formation fluids within the well. Unfortunately, changes in pressure or shocks to the drill string may cause prior art valves to open prematurely, resulting in inaccurate sampling, or to open a second time, losing or contaminating the captured sample. A valve opening at the wrong depth destroys the value of the test. Improving the reliability of the dirty fluid valve is therefore important due to the high completion costs associated with oil and gas exploration. Completion of a hole at the wrong depth is a serious error that is tremendously difficult to correct.

The present patent application is assigned to Gilmore Valve Co. Since the early 1990's, Gilmore Valve Co. has sold various types of dirty fluid valves (including drawing numbers 25080, 25081, 25085 ad 25086, copies of which are included with the INFORMATION DISCLOSURE STATEMENT filed concurrently herewith) without a mechanical latching or detent system. There is therefore a need for a mechanical latching system to improve the reliability of dirty fluid valves and the downhole test samples they control. Other art valves have attempted to overcome the problem of premature opening of the valve. Detenting mechanisms shown in the prior art generally involve detent grooves or holes on a piston that accept detent balls or a ring that is urged inwardly. Further, prior art detent systems generally secure the valve in, or urge the valve toward, only one position.

One such prior art valve is disclosed in U.S. Pat. No. 4,364,412 to Peters for a pull type relay valve with an automatic lockout. This valve utilizes pilot pressure actuation to lock the slide valve in position. The valve is sealed by O-rings on a piston. A compression spring is used within a piston channel to push against the piston to continuously urge the slide valve inwardly towards the closed or seated position. The valve is opened by manually pulling the slide valve to the set or opened position.

Another prior art valve is a control valve having a centering and detenting mechanism as disclosed in U.S. Pat. No. 4,260,132 to Habiger. The mechanism includes first and second coil springs disposed concentrically and in overlapping relationship relative to one another. A flange integral to a tubular retainer forms a stop surface to engage a piston and precisely position it within the retainer. A plurality of circumferentially spaced holes are formed through a tubular extension of the tubular retainer to mount ball-type detents. The detents are urged radially inwardly into seating engagement within the holes of the tubular extension.

SUMMARY OF THE INVENTION

The dirty fluid sampling valve of the present invention is adapted to be inserted in a valve chamber of a downhole tool for sampling wellbore fluids. The tool has at least one wellbore fluid inlet connected to at least one dirty fluid valve and at least one sample collection bottle. The tool has at least one wellbore fluid outlet so the collection bottle can be drained for laboratory analysis. The tool includes at least one open pilot to deliver open fluid to the valve, and at least one close pilot to deliver close fluid to the valve, as described below.

The valve has a valve body that defines pilot open and pilot close ports, as well as valve inlet and outlet ports. The inlet and outlet ports are in fluid communication with the inlet and outlet of the downhole tool. The valve body has a central bore which houses a piston, the piston being moveable between valve open and valve closed positions in response to pressure from the pilot open and pilot close ports.

The piston carries a seal assembly that blocks fluid communication between the valve inlet and outlet ports when the piston is in the valve closed position. The piston further includes a detent assembly which releasingly engages a first detent groove in the valve body when the piston is in the valve closed position and releasingly engages a second detent groove in the valve body when the piston is in the valve open position.

In a preferred embodiment, the detent assembly includes a c-ring that is engaged and urged outwardly by radially extending pins. The pins are urged outwardly by a ball bearing that is continuously biased by a spring carrier in combination with at least one belleville spring. The spring or springs are captured between the spring carrier and an adjusting nut that threadably engages the piston.

As the piston moves into the valve open or valve closed position, the c-ring is aligned with the corresponding detent groove. The belleville spring urges the spring carrier against the ball bearing to bias the pins against the detent ring, thereby urging the detent ring into the detent groove. Upon pressure sufficient to further compress the belleville spring, the detent ring compresses to disengage the detent groove allowing the piston to move within the central bore. This mechanical latching or detent system reduces the likelihood that the dirty fluid valve will unintentionally open or close.

DETAILED DESCRIPTION

The valve of the present invention is designed for insertion into a valve chamber in the body of a conventional downhole sampling tool, not shown. The downhole tool includes an inlet open to the wellbore, at least one open pilot to deliver open fluid to the valve when the open pilot is actuated or pulsed to open the valve, and at least one close pilot to deliver close fluid to the valve when the close pilot is actuated or pulsed to close the valve. The body of the downhole tool further defines a pilot close port, a pilot open port, a wellbore fluid inlet and at least one wellbore fluid outlet connected to at least one sample collection bottle.

Figure 1:
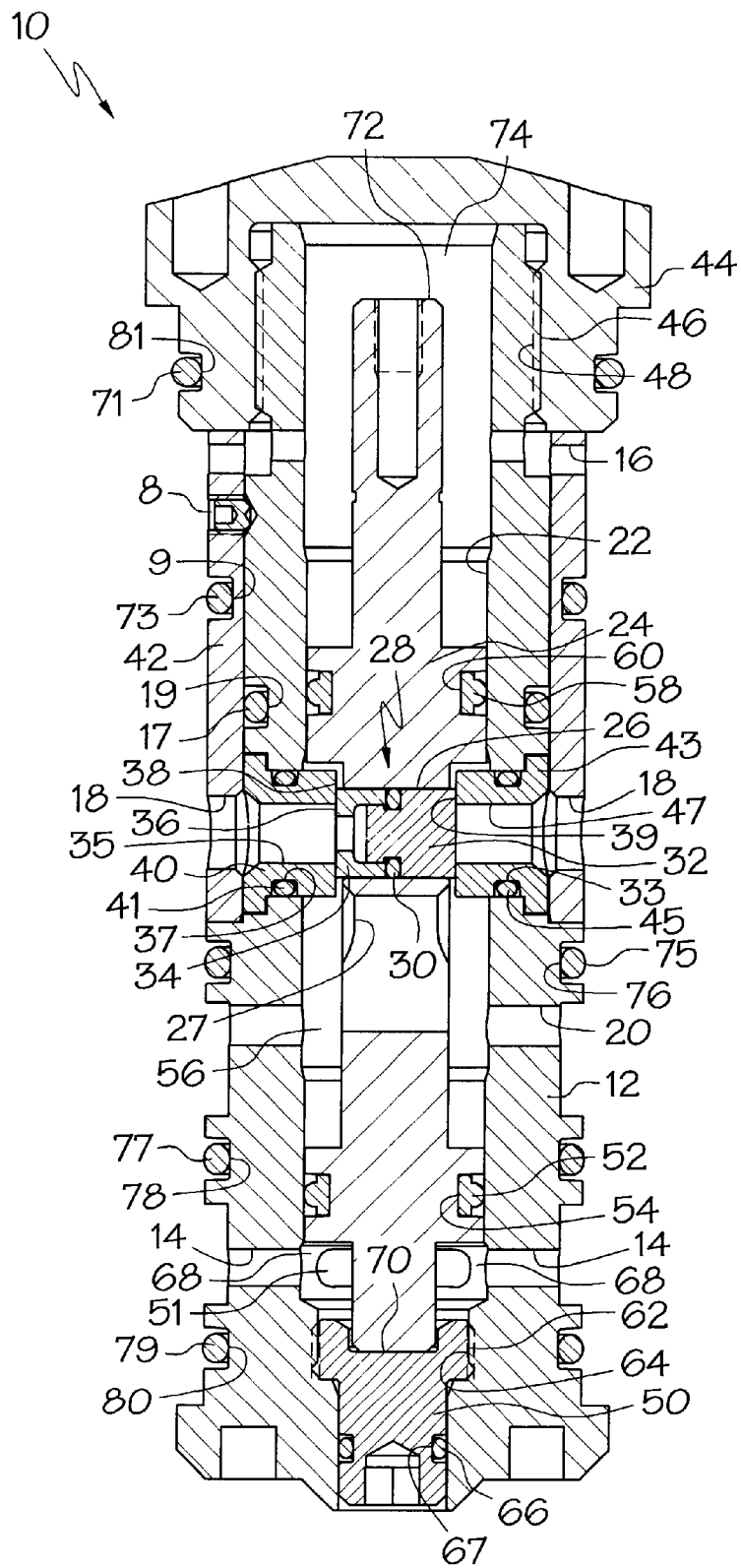
FIG. 1 is a section view of the prior art dirty fluid valve produced by Gilmore Valve Co.

Referring to FIG. 1 there is shown a prior art embodiment of a dirty fluid sampling valve generally designated 10. The prior art valve in FIG. 1 does not have a mechanical latching or detent system. The valve in FIG. 1 has been produced and sold by Gilmore Valve Co., the assignee of the present invention. The valve includes a valve body 12 which in combination with a valve cover 42 includes apertures defining a pilot open port 14, a pilot close port 16, an inlet or supply port 18 and an outlet or function port 20. The pilot open port 14 is in fluid communication with a pilot valve, not shown and the pilot close port 16 is in fluid communication with a second pilot valve, not shown. Together these two pilot valves control the dirty fluid valve 10. The inlet or supply port 18 and the outlet or function port 20 are in communication with the environment immediately surrounding the downhole tool. For example, when the tool is in the hole the inlet port 18 is in fluid communication with wellbore fluids. When the tool is out of the hole, the outlet port 20 is exposed to atmosphere and the contents of the sample collection bottle can be removed and taken to the laboratory for analysis.

An O-ring 17 in O-ring channel 19 creates a seal between the body 12 and the valve cover 42, and a screw set 8 secures valve cover 42 in position to prevent rotation. While this valve construction is presently preferred, it is understood that one skilled in the art could substitute a single valve part to accomplish the operation of the body 12 and valve cover 42.

The valve body 12 further includes a central bore 22 sized to receive and house a piston 24, which is axially movable within bore 22 from a valve open position to a valve closed position. In FIG. 1, the valve 10 is shown in the closed position.

Piston 24 includes transverse bores 26 and 27. Bore 26 houses a seal assembly generally designated 28. The seal assembly 28 includes an O-ring 30 held in position by seal 32 and seal ring 34. The seal assembly 28 slides into sealing engagement with a sealing face 38 of seal plate 40 and sealing face 39 of seal plate 43. Seal plate 40 and seal plate 43 are positioned in the body 12. Seal plate 40 has an O-ring groove 37 that receives O-ring 41. Seal plate 43 has an O-ring groove 33 that receives O-ring 45. Seal plate 40 has a through bore 35 and seal plate 43 has a through bore 47, both through bores being in fluid communication with the inlet port 18.

A cap 44 is threadably engaged to the body 12 at cap threads 46 and body threads 48, and a plug 50 threadably engages the body 12 at body threads 62 and plug threads 64. The cap 44 limits the axial movement of piston 24 when the valve is in the valve open position, and plug 50, in combination with spring pins 51, limits the axial movement of piston 24 when the valve is in the valve closed position. A seal is formed at plug 50 with an O-ring 66 positioned in an O-ring groove 67.

The piston 24 includes a reduced diameter end portion 72 which creates a pilot close chamber 74 between the piston end 72, the body 12 and the cap 44. The close chamber 74 is sealed by a t-seal 58 in channel 60. When the downhole tool is actuated to introduce pilot fluid into the pilot close port 16, the close chamber 74 fills with pilot fluid, exerting pressure against the piston 24, forcing the piston 24 into the valve closed position shown in FIG. 1. In the valve closed position, the seal assembly 28 comes into sealing engagement with the seal plates 40 and 43, thereby preventing fluid from entering the valve inlet port 18.

The piston 24 further includes a reduced diameter end portion 70 which forms a pilot open chamber 68 between the piston end 70, the body 12 and the plug 50. The chamber 68 is sealed by a t-seal 52 in a channel 54. When the downhole tool is actuated to introduce fluid into the pilot open port 14, the chamber 68 fills with pilot fluid, exerting pressure against the piston 24, forcing the piston 24 into the valve open position, not shown. In the valve open position the seal assembly 28 disengages from the seal plates 40 and 43, allowing fluid to flow into a flow channel 56 and out through the outlet port 20 into the sample collection bottles, not shown.

As discussed, the dirty fluid valve 10 is designed for insertion into a valve chamber in the body of a conventional downhole tool, not shown. A seal between the tool and valve 10 is achieved by a series of O-rings in a series of corresponding O-ring grooves located along the exterior of the valve 10. O-ring 71 is positioned in O-ring groove 81. O-ring 73 is positioned in O-ring groove 9. O-ring 75 is positioned in O-ring groove 76. O-ring 77 is positioned in O-ring channel 78. O-ring 79 is positioned in O-ring groove 80.

While this prior art performs satisfactorily under most conditions, variations in pressure and string shocks can cause the valve to open prematurely, partially or repeatedly during operation.

Figure 2:
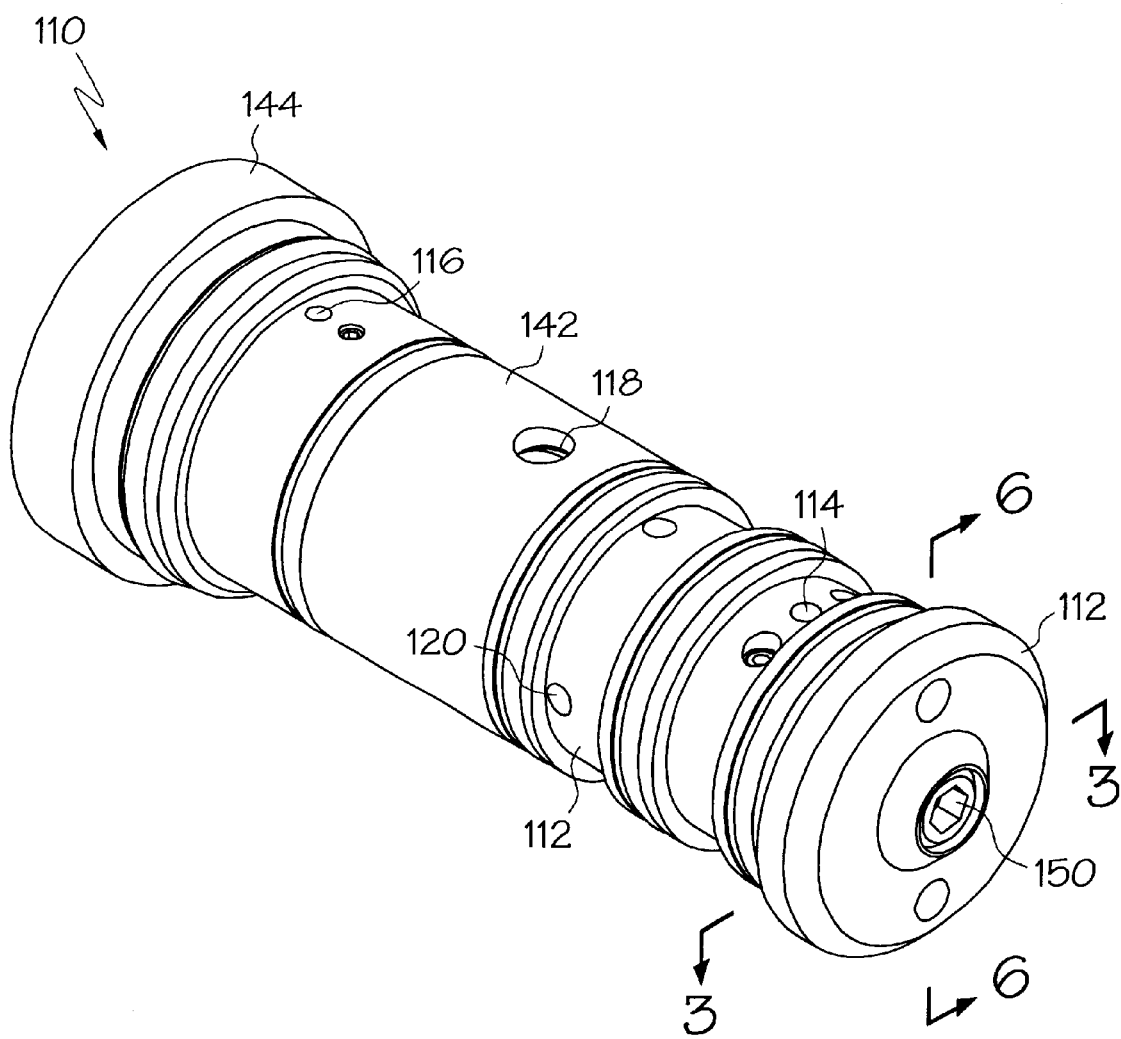
FIG. 2 is a perspective view of the preferred embodiment of the dirty fluid sampling valve of the present invention.
Figure 4:
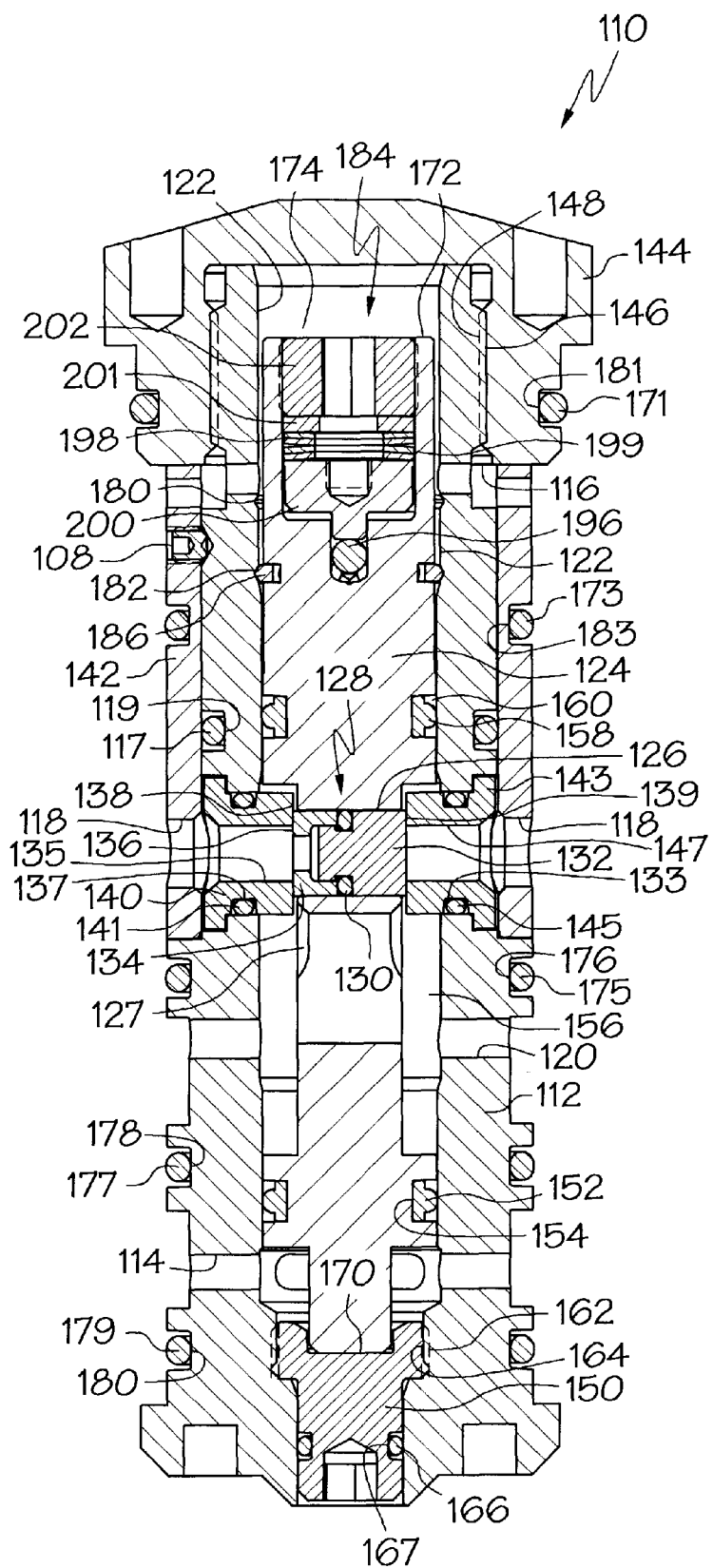
FIG. 4 is a cross-sectional view along line 6—6 in FIG. 2 of the preferred valve in the closed position.

To overcome these limitations of the prior art there is shown a preferred embodiment of the present invention in FIG. 2, a dirty fluid sampling valve generally designated 110. The valve 110 is a two position, two-way valve. The valve includes a valve body 112 which in combination with a valve cover 142 includes apertures defining a pilot open port 114, a pilot close port 116, a supply or inlet port 118 and a function or outlet port 120. The valve 110 further includes a cap 144 and a plug 150. A seal is formed at plug 150 with an O-ring 166 positioned in an O-ring groove 167. FIG. 4 is a section view of the dirty fluid valve with mechanical latch 110 along the line 6—6 of FIG. 2. In FIG. 4 the valve 110 is shown in the closed position. An O-ring 171 is positioned in O-ring groove 181. An O-ring 173 is positioned in O-ring groove 183. An O-ring 175 is positioned in O-ring groove 176. An O-ring 177 is positioned in O-ring channel 178. O-ring 179 is positioned in O-ring groove 180. The O-rings 171, 173, 175, 177 and 179 create a seal between the valve 110 and the valve chamber in the body of the downhole tool, not shown. A screw set 108 secures valve cover 142 in position to prevent rotation about the body 112. While this valve construction is presently preferred, it is understood that one skilled in the art could substitute a single valve part to accomplish the operation of the body 112 and valve cover 142.

Figure 3:
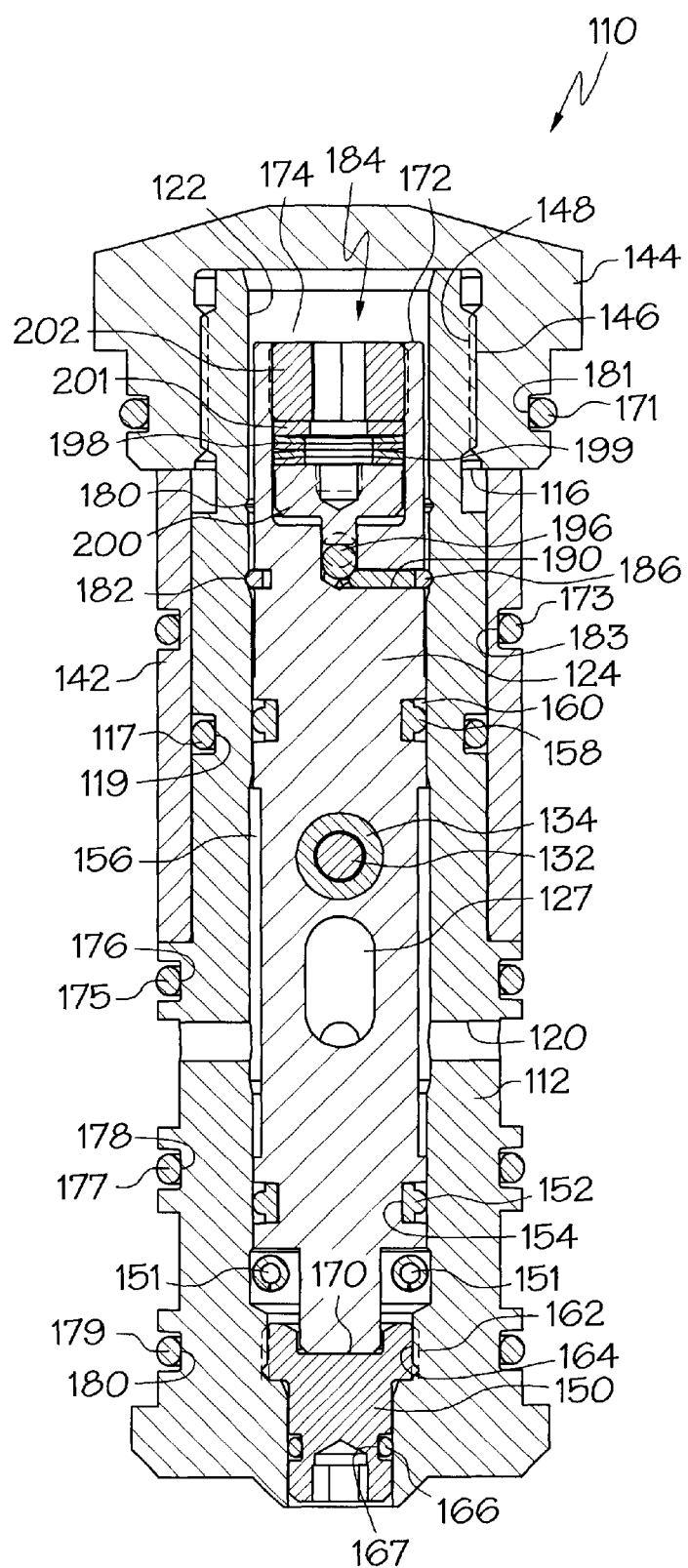
FIG. 3 is a cross-sectional view along line 3—3 in FIG. 2 of the preferred valve in the closed position.
Figure 5:
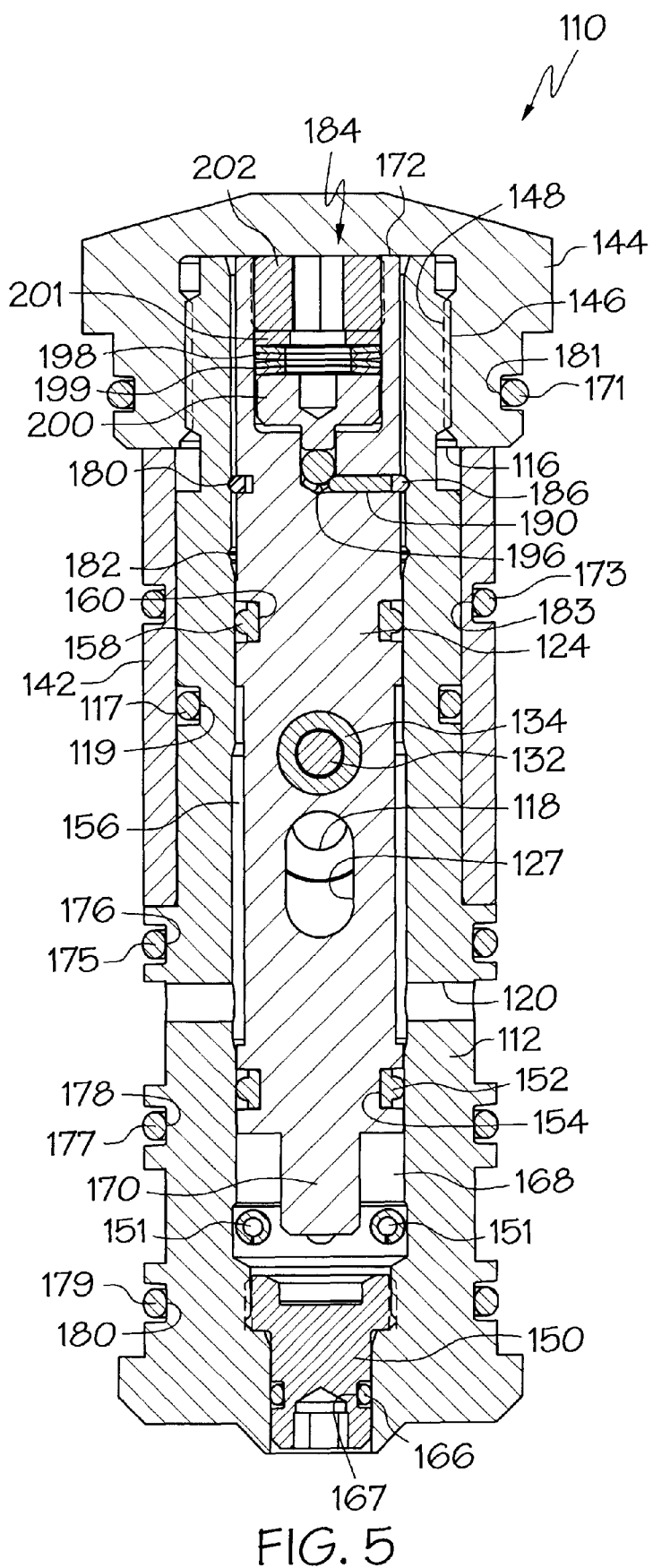
FIG. 5 is a cross—sectional view along line 3—3 in FIG. 2 of the preferred valve in the open position.
Figure 6:
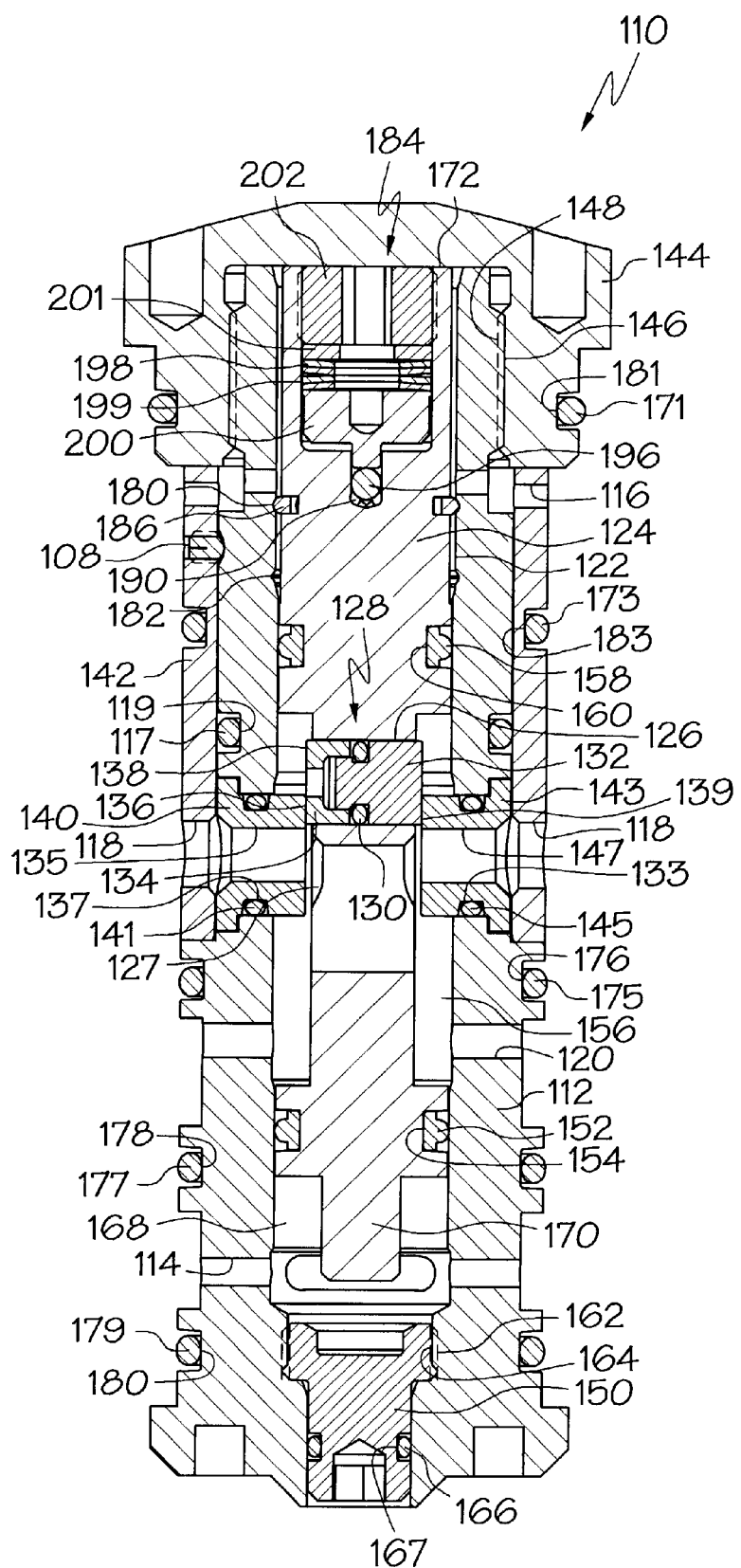
FIG. 6 is a cross-sectional view along line 6—6 in FIG. 2 of the preferred valve in the open position.

As is seen more clearly in the cross-sectional views FIG. 3 through FIG. 6, the valve body further includes a central bore 122 sized to receive and house a piston 124, which is axially movable within central bore 122 from a valve open position to a valve closed position. FIGS. 3 and 4 show the valve 110 in the closed position and FIGS. 5 and 6 show the valve 110 in the open position. The central bore 122 includes detent grooves 180, 182 corresponding to the valve open and valve closed positions, respectively.

Piston 124 includes transverse bores 126 and 127. Bore 126 and 127 enhance and balance flow from the valve inlet 118 when the piston 124 is in the valve open position. Bore 126 houses a seal assembly generally designated 128. The seal assembly 128 includes an O-ring 130 held in position by seal 132 and seal ring 134. The seal assembly 128 slides into sealing engagement with a sealing face 138 of seal plate 140 and sealing face 139 of seal plate 143. Seal plate 140 and seal plate 143 are positioned in the body 112. Seal plate 140 has an O-ring groove 137 that receives O-ring 141. Seal plate 143 has an O-ring groove 133 that receives O-ring 145. Seal plate 140 has a through bore 135 and seal plate 143 has a through bore 147, both through bores being in fluid communication with the inlet port 118.

The cap 144 is threadably engaged to the body 112 at cap threads 146 and body threads 148, and the plug 150 threadably engages the body 112 at body threads 162 and plug threads 164. The cap 144 limits the axial movement of the piston in the valve open position and the plug 150, in combination with the spring pins 151 limits the axial movement of piston 124 in the valve closed position.

The piston 124 includes a reduced diameter end portion 172 which creates a pilot close chamber 174 between the piston end 172, the body 112 and the cap 144. The close chamber 174 is sealed by a t-seal 158 in groove 160. The piston 124 further includes a reduced diameter end portion 170 which forms a pilot open chamber 168 between the piston end 170, the body 112 and the plug 150. The open chamber 168 is sealed by a t-seal 152 in a groove 154.

Figure 7:
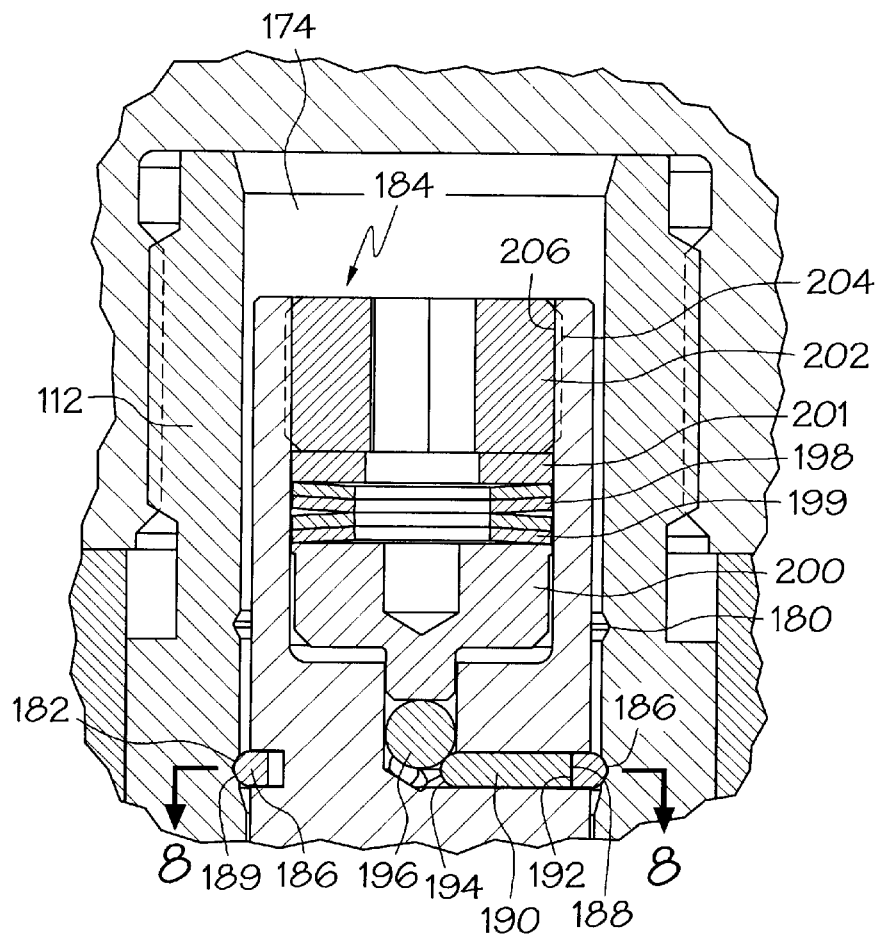
FIG. 7 is an enlarged cross sectional view of the mechanical latching or detent assembly of the preferred valve in the closed position as shown in FIGS. 3 and 4.
Figure 8:
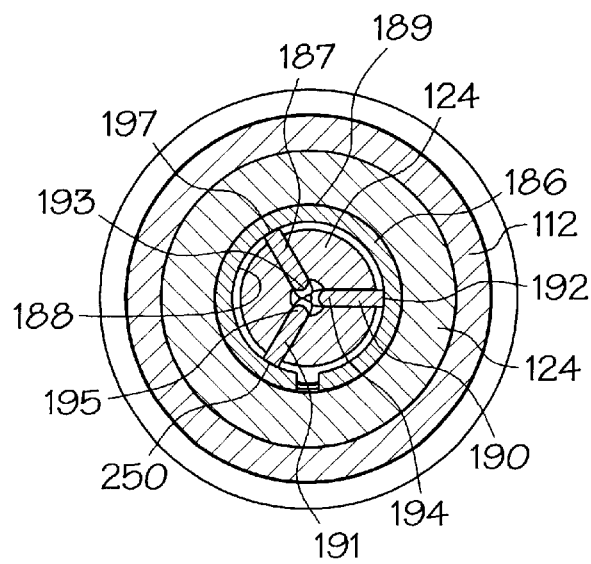
FIG. 8 is a cross-sectional plan view of the detent assembly of the preferred valve along the line 8—8 of FIG. 7.

In a preferred embodiment there is illustrated a mechanical latching or detent assembly generally designated 184, shown in more detail in FIGS. 7 and 8. The detent assembly 184 is comprised of a c-shaped detent ring 186. The ring is defined as having a "c" shape as the ring has a portion removed to allow the ring 186 to be compressed and expanded as to circumference, as is discussed below. The ring has a d-shaped cross-section having a linear interior surface 188 and a rounded exterior surface 189 sized to fit within the detent grooves 180, 182 in the central bore 122. 35. At least two pins 187 and 190 are radially arranged with the distal ends 197 and 192 of the pins engaging the interior surface 188 of the detent ring 186, forcing the detent ring 186 outward. Presently preferred is the use of three pins 187, 190 and 191 in radial arrangement at 120° intervals as illustrated in FIG. 8. Pin 187 has a proximal end 193 and a distal end 197. Pin 190 has a proximal end 194 and a distal end 192. Pin 191 has aproximal end 195 and a distal end 250. The proximate ends 193, 194 and 195 of the pins 187, 190 and 191 are in contact with a ball bearing 196. At least one belleville spring 198 bears on the ball bearing through spring carrier 200. Presently preferred is the use of two springs 198 and 199. An adjusting nut 202 holds the springs 198 in place through spring spacer 201, the adjusting nut 202 threadably engages the piston 124 at piston threads 204 and adjusting nut threads 206. The adjusting nut 202 can be rotated to vary the load on the springs 198. In a preferred embodiment the load can be adjusted between 50 and 100 lbs.

The detent assembly 184 of the present invention is defined as an energized system, as the detent ring 186 is continually biased outwardly by the springs 198 and 199. The springs 198 and 199 are always under compression, and therefore continually urge the spring carrier 200 against the ball bearing 196. The ball bearing 196 biases the pins 187, 190 and 191 outwardly against the detent ring 186, which releasingly engages the detent grooves 180, 182.

Prior to insertion of the downhole tool into the wellbore, the tool is pulsed to introduce fluid into the pilot close port 116, and the close chamber 174 fills with fluid. This exerts pressure against the piston 124, forcing the piston 124 into the valve closed position shown in FIGS. 3 and 4. The detent ring 186 is biased by the distal ends 197, 192 and 250 of the pins 187, 190 and 191 outwardly into the valve closed detent groove 182. In the valve closed position, the seal assembly 128 comes into sealing engagement with the seal plate 140 and 143, thereby preventing fluid from entering the valve inlet port 118. Due to the biasing of the detent ring 186 into the valve closed detent groove 182, variations in pressure or shock to the drill string do not cause the piston 124 to inadvertently change position.

When a sample is to be taken, pilot fluid is introduced into the pilot open port 114. As the open chamber 168 fills with fluid, pressure is exerted against the piston 124, forcing the piston 124 toward the valve open position as shown in FIGS. 5 and 6. When the pressure exerted on the piston 124 exceeds the load on the springs 198 and 199, the springs are further compressed. This compression allows the ball bearing 196 to move toward the springs 198 and 199 the proximate ends 193, 194 and 195 of the pins 187, 190 and 191 slip toward each other under the ball bearing 196, and the detent ring 186 contracts to disengage the valve closed detent groove 182 and enter the central bore 122. The piston 124 is then free to move to the valve open position. Upon reaching the valve open position, the detent ring 186 expands outward and engages the valve open detent groove 180. The detent ring 186 is then biased into the valve open detent groove 180 by the springs 198 and 199.

In the valve open position the seal assembly 128 disengages the seal plate 140 and 143, allowing fluid to flow through the valve inlet port 118 into the piston bore 127 and the flow channel 156, and out through the outlet port 120 into the collection bottles, not shown.

Once the sample is collected, the downhole tool is pulsed to force pilot fluid into the pilot close port 116 and the pilot close chamber 174, and the valve is closed in the same manner as described above.

Having described the invention in detail, those skilled in the art will appreciate that modifications may be made of the invention without departing from its spirit and scope. Therefore, it is not intended that the scope of the invention be limited to the specific embodiments described. Rather, it is intended that the scope of the invention be determined by the appended claims and their equivalents.

What is claimed is:

1. A mechanically latching valve adapted to be inserted in a valve chamber in the body of a downhole tool for sampling wellbore fluids, the tool having at least one sample collection bottle, an inlet open to a wellbore, at least one open pilot to deliver open fluid to the valve when the open pilot is pulsed to open the valve, and at least one close pilot to deliver close fluid to the valve when the close pilot is pulsed to close the valve, the body of the downhole tool further defining a pilot close port, a pilot open port, a wellbore fluid inlet and a wellbore fluid outlet to the sample collection bottle, the mechanically latching valve comprising:

a valve body defining a valve pilot open port, a valve pilot close port, a valve inlet port, and a valve outlet port in fluid communication with the outlet port of the downhole tool and the sample collection bottle, the valve pilot open port in fluid communication with the pilot open port of the downhole tool, the valve pilot close port in fluid communication with the pilot close port of the downhole tool, the valve body having a central bore;

a piston sized and arranged to slide from a valve open position to a valve close position in the central bore of the valve body in response to the forces applied to the piston by the open fluid and the close fluid;

a seal assembly carried by the piston, the seal assembly blocking fluid communication between the valve inlet port and the valve outlet port when the valve is in the closed position and the seal assembly allowing wellbore fluids to flow from the valve inlet port to the valve outlet port and into the sample collection bottle when the valve is in the open position; and a detent assembly carried by the piston and releasingly engaging a first detent groove in the central bore of the valve body when the valve is in the closed position and releasingly engaging a second detent groove in the central bore of the valve body when the valve is in the open position.

2. The mechanically latching valve of claim 1 wherein the detent assembly comprises:

a c-shaped detent ring;

at least two pins in radial arrangement, the pins having proximate ends and distal ends, the distal ends engaging an interior surface of the detent ring;

a ball bearing in contact with the proximate ends of the pins;

a spring carrier bearing against the ball bearing;

a belleville spring captured between the spring carrier and an adjusting nut, the adjusting nut threadably engaging the piston; and whereby the belleville spring urges the spring carrier against the ball bearing to bias the pins against the detent ring, thereby urging the detent ring into a detent groove, and whereby upon pressure sufficient to further compress the belleville spring the detent ring compresses to disengage the detent groove allowing the spool to move within the central bore.

3. The mechanical latching valve of claim 2 wherein the adjusting nut can be turned to vary the load on the belleville spring.

4. A valve detent assembly comprising:

a c-shaped detent ring;

at least two pins in radial arrangement at substantially equal intervals, the pins having proximate ends and distal ends, the distal ends engaging an interior surface of the detent ring;

a ball bearing in contact with the proximate ends of the pins;

a spring carrier bearing against the ball bearing;

a belleville spring captured between the spring carrier and an adjusting nut, the adjusting nut being capable of varying the load on the belleville spring;

whereby the belleville spring urges the spring carrier against the ball bearing to bias the pins against the detent ring, thereby urging the detent ring into a detent groove, and whereby upon pressure sufficient to further compress the belleville spring the detent ring compresses to disengage the detent ring from the detent groove.

5. A mechanically latching valve adapted to be inserted in a valve chamber in the body of a downhole tool for sampling wellbore fluids, the tool having at least one sample collection bottle, an inlet open to a wellbore, at least one open pilot to deliver open fluid to the valve when the open pilot is pulsed to open the valve, and at least one close pilot to deliver close fluid to the valve when the close pilot is pulsed to close the valve, the body of the downhole tool further defining a pilot close port, a pilot open port, a wellbore fluid inlet and a wellbore fluid outlet to the sample collection bottle, the mechanically latching valve comprising:

a valve body defining a valve pilot open port, a valve pilot close port, a valve inlet port, and a valve outlet port in fluid communication with the outlet port of the downhole tool and the sample collection bottle, the valve pilot open port in fluid communication with the pilot open port of the downhole tool, the valve pilot close port in fluid communication with the pilot close port of the downhole tool, the valve body having a central bore;

a piston sized and arranged to slide from a valve open position to a valve close position in the central bore of the valve body in response to the forces applied to the piston by the open fluid and close fluid;

a seal assembly carried by the piston, the seal assembly blocking fluid communication between the valve inlet port and the valve outlet port when the valve is in the closed position and the seal assembly allowing wellbore fluids to flow from the valve inlet port to the valve outlet port and into the sample collection bottle when the valve is in the open position; and a detent assembly carried by the piston and releasingly engaging a first detent groove in the central bore of the valve body when the valve is in the closed position and releasingly engaging a second detent groove in the central bore of the valve body when the valve is in the open position, the detent assembly having:

a c-shaped detent ring;

at least two pins in radial arrangement, the pins having proximate ends and distal ends, the distal ends engaging an interior surface of the detent ring;

a ball bearing in contact with the proximate ends of the pins;

a spring carrier bearing against the ball bearing;

a belleville spring captured between the spring carrier and an adjusting nut, the adjusting nut threadably engaging the piston; and whereby the belleville spring urges the spring carrier against the ball bearing to bias the pins against the detent ring, thereby urging the detent ring into a detent groove, and whereby upon pressure sufficient to further compress the belleville spring the detent ring compresses to disengage the detent groove allowing the spool to move within the central bore.

* * * * *